United States Patent Office 2,719,863
Patented Oct. 4, 1955

2,719,863

ALDOL CONDENSATION OF KETONES

John Harris Haslam, Wilmington, Del., assignor to E. I. du Pont de Nemours and Company, Wilmington, Del., a corporation of Delaware No Drawing. Application July 16, 1952,
Serial No. 299,281

11 Claims. (Cl. 260—586)

This invention relates to organic chemical reactions and more particularly to improved aldol type condensation reactions and to novel methods for promoting such reactions.

The condensation polymerization of aldehydes, aldehydes and ketones, or ketones is commonly referred to as aldol condensation. The process is usually carried out in the presence of dilute acids, such as $H_2SO_4$, HCl, etc., or alkalies, such as NaOH, $Ba(OH)_2$, etc., as catalytic condensation agents. In many cases these agents cause the reaction to progress too far so that important useful intermediate products are not recoverable. In other instances the reaction fails to proceed far enough. For example, in the preparation of mesityl oxide from acetone, the use of lime or HCl catalysts produces only diacetone alcohol. In other cases the use of acid or alkali condensation agents will not cause the condensations to proceed because of the prevalence of other reactions.

It is an object of this invention to overcome these and other disadvantages in prior aldol condensation type reactions and to provide a novel and improved method for promoting condensation polymerization reactions of the aldol type. A further object is to provide a novel catalytic agent in processes for the production of condensation products, and particularly condensation products of compounds containing a carbonyl radical, such as aldehydes and ketones, and mixtures thereof. A further object is the control of the condensation by the use of mild promoting agents adapted to give intermediate products which previously have been obtainable only by resort to more complicated procedures. A still further object is to provide a process for the preparation of useful organic condensation products such as, for example, diacetone alcohol, triacetone dialcohol, mesityl oxide, dibenzalacetone, cyclohexylidene cyclohexanone, and dicyclohexylidene cyclohexanone, and similar types of useful condensation products.

These and other objects and advantages are attainable in this invention which comprises conducting an aldol type condensation polymerization reaction in the presence of a titanium ortho ester, or derivative thereof, as the condensing agent.

In a more specific and preferred embodiment, the invention comprises conducting an aldol condensation polymerization reaction in the presence of an alkyl titanate as a promoting catalyst therefor.

In practically applying the invention, the aldehyde, aldehyde and ketone, or ketone, or various mixtures and combinations thereof, can be suitably mixed with the organic titanium compound or mixture employed as the condensing agent, the condensation reaction being then effected in a conventional manner, as by allowing the reaction mixture to stand at room temperature in the absence of atmospheric moisture, refluxing said mixture for several hours, again allowing it to stand for a prolonged period, and then recovering the desired products by hydrolysis and distillation. Any titanium organic compound containing at least one titanium-ester linkage per molecule, including titanium ortho esters, condensed titanium esters and polytitanium ester carboxylates, can be used herein. Thus, ortho esters corresponding to the general formula $Ti(OR)_4$ wherein R is an organic hydrocarbon radical, e. g., alkyl, aryl, aralkyl, alkaryl, etc., and of which methyl, ethyl, propyl, butyl, hexyl octyl, phenyl, benzyl, tolyl, naphthyl, etc., are examples, can be used. Alkyl titanates, such as those of methyl, ethyl, propyl, isopropyl, and the various butyl esters, are especially preferred for use, and can be prepared, for example, by reacting $TiCl_4$ with an anhydrous monofunctional alcohol in accordance with known procedures. Mixed ortho esters comprise those corresponding to the formula

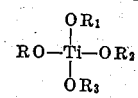

wherein all the hydrocarbon radicals joined through oxygen to the titanium are dissimilar and R, $R_1$, $R_2$, and $R_3$ comprise the radicals above mentioned. Condensed esters or polytitanic esters comprise those corresponding to the formula

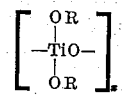

wherein R comprises the hydrocarbon radicals contemplated above and in which $x$ is an integer of at least 1. These can be prepared by reacting an ortho ester with less than 2 mols of water per mol of ortho ester. Similarly, titanium ester carboxylates or titanium ester acylates comprise those corresponding to the formula

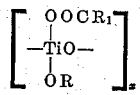

in which R and $R_1$ are different hydrocarbon radicals and such as those already mentioned and $x$ is an integer of at least 1. These can be formed, for example, by reacting a titanium ortho ester or polytitanate with an organic, especially an aliphatic (acetic, valeric, lauric, stearic, behenic, etc.) acid, during which reaction a portion of the alcohol is displaced. The mild condensing agent of Example II below is a typical polytitanium ester carboxylate and has the formula

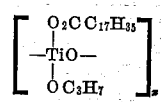

The contemplated titanium ester compounds are effectively useful in widely varying amounts. For economic reasons I prefer to use as little of the ester as possible. Generally, about one mol of ester is required per mol of product, although amounts ranging from, say, .1 of a mol/mol of product or less, to one to two mols of ester per mol of product can be utilized.

To a clearer understanding of the invention, the following specific examples are given. These are merely illustrative and not in limitation of my invention:

Example I

Two mols of acetone and one mol of tetraisopropyl titanate were mixed and allowed to stand at room temperature in the absence of atmospheric moisture. Crystals began to form the first day. At the end of three days the crystals were filtered off and were thrown into about 1% $H_2SO_4$ solution. $TiO_2$ was formed and was filtered off. The filtrate was extracted with successive portions of ether and from the extracts was recovered an oil boiling at about 130° C. at 16–17 mm. Analysis showed this material to be triacetone dialcohol. The yield was 20% based on the acetone added. Further standing of the mother liquor from which the crystals were removed gave additional product.

Example II

In a liquid-liquid extraction apparatus, condensed acetone vapor was bubbled through a solution of polyisopropoxy titanium stearate in cyclohexane held at about 50° C., and the excess acetone was continuously overflowed and recycled to the boiler. After 48 hours the boiler contained considerable quantities of diacetone alcohol and mestyl oxide, which were recovered by fractional distillation.

Example III

Two mols of benzaldehyde and one mol of acetone were mixed with one mol of tetraisopropyl titanate and refluxed for 24 hours. Large quantities of yellow crystals were obtained and were purified by recrystallization in alcohol. They contained no titanium and were identified as dibenzalacetone.

|  | Observed | Literature |
|---|---|---|
| M. P., ° C | 112 | 112 |
| 2,4-Dinitro phenylhydrazone, M. P., ° C | 178-9 | 180 |
| Tetrabromide, M. P., ° C | 216 | 208-211 |

The yield obtained was 83% of the theoretical yield.

Example IV 100 ml. of tetraisopropyl titanate and 300 ml. of cyclohexanone was mixed together and refluxed for 10 hours, then allowed to stand overnight out of contact with atmospheric moisture. After 4 hours' refluxing, precipitation started and by the end of the standing period the reaction vessel was set up as a thixotropic mass. The product was recovered by pouring into dilute $H_2SO_4$, separating the oil layer, and removing isopropanol and unreacted cyclohexanone by distillation. Vacuum distillation gave a fraction boiling at 96.5–100° C. at <1 mm. which was identified as cyclohexylidene cyclohexanone, and a small amount of a higher boiling fraction (166–167° C. at <1 mm.).

The analysis of the lower boiling fraction was as follows:

|  | Found | $C_{12}H_{18}O$ Theoretical |
|---|---|---|
| carbon | 80.51 | 80.8 |
| hydrogen | 10.19 | 10.11 |
| mol. wt | 176 | 178 |

Example V

In order to increase the amount of the highest boiling fraction obtained in Example IV, the procedure of that example was repeated using an excess of tetraisopropyl titanate. 1 gram mol of cyclohexanone was reacted with 2.1 gram mols of tetraisopropyl titanate and the product recovered in the same manner as used in Example IV. Fractions were obtained as follows:

|  | B. P. at < .2 mm. | grams |
|---|---|---|
| Fr. #1 | 87–115° C | 6.6 |
| Fr. #2 | 115–150° C | 5.5 |
| Fr. #3 | 169–172° C | 6.3 |

The highest boiling fraction (#3) was identified as dicyclohexylidene cyclohexanone.

|  | Found | $C_{18}H_{26}O$ Theoretical |
|---|---|---|
| carbon percent | 82.2 | 83.7 |
| hydrogen do | 10.54 | 10.1 |
| mol. wt | 245 | 258 |

The meaning and scope of the term "aldol condensation," as described in the literature and as used herein, refers to the joining by condensation polymerization of a carbon atom in the alpha position with respect to the carbonyl radical of an aldehyde

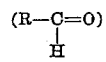

or ketone

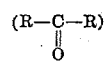

type organic compound, and having at least one hydrogen attached, to the carbon of a carbonyl group of a molecule of the same molecular species or of another aldehyde or ketone compound, in the presence of a condensing agent. Examples of such compounds include acetaldehyde, propionaldehyde, benzaldehyde, etc., acetone, methyl ethyl ketone, methyl propyl ketone, diethyl ketone, methyl phenyl ketone, etc. Such condensations include simple additions as described above to form hydroxy ketones or aldehydes, according to the reactants selected, as well as similar additions which are accompanied by splitting out of water at the junction bond, forming an alpha-beta unsaturated aldehyde or ketone. Such condensation polymerizations may be carried through the simple addition step, as for example the condensation of two molecules of acetone to form diacetone alcohol at room temperature using tetraisopropyl titanate as the condensing agent, or under somewhat higher temperature conditions, using polyisopropoxy titanium stearate, the condensation of acetone takes place with the splitting off of water to form $CH_3.CO.CH=C(CH_3)_2$ (mesityl oxide) in considerable quantity. Further examples of splitting water during the condensation are shown in the condensation of acetone with benzaldehyde to form dibenzalacetone, and in the self-condensation of cyclohexanone, forming the unsaturated cyclohexylidene cyclohexanone compounds.

I claim as my invention:

1. A method for conducting an aldol condensation reaction which comprises effecting said reaction in the presence of from .1 to 2 moles per mole of condensation product being produced, of a titanium organic compound containing at least one titanium-ester linkage per molecule selected from the group consisting of a titanium ortho ester, a condensed titanium ester, and a polytitanium ester carboxylate, and upon completion of the reaction separating and recovering the products polymerized in said reaction.

2. A method for conducting an aldol condensation reaction which comprises effecting said reaction in the presence of from .1 to 2 moles per mole of condensation product being produced, of an alkyl titanate, and upon completion of the reaction separating and recovering the products polymerized in said reaction.

3. A process for conducting the condensation polymerization of an aldehyde with at least one hydrogen attached to the carbon in alpha position with respect to the carbonyl radical, which comprises effecting said polymerization in the presence of from .1 to 2 moles per mole of condensation product being produced, of a titanium ortho ester, and upon completion of the reaction separating and recovering the products polymerized in said reaction.

4. A process for conducting the condensation polymerization of a ketone with at least one hydrogen attached to the carbon in alpha position with respect to the carbonyl radical, which comprises effecting said polymerization in the presence of from .1 to 2 moles per mole of condensation product being produced, of a titanium ortho ester, and upon completion of the reaction separating and recovering the products polymerized in said reaction.

5. A process for condensing and polymerizing a carbonyl group-containing compound selected from the group consisting of aldehydes and ketones which comprises effecting the condensation polymerization thereof in the presence of from .1 to 2 moles per mole of condensation product being produced, of a titanium ortho ester, and thereafter separating and recovering the polymerized product from the reaction mixture by hydrolysis, solvent extraction, and distillation treatments.

6. A process for the preparation of triacetone dialcohol comprising mixing acetone with from .1 to 2 moles per mole of triacetone dialcohol being produced, of titanium tetraisopropylate, allowing the mixture to stand out of contact with moist air at room temperature, and recovering the product formed by hydrolysis, solvent extraction, and distillation.

7. A process for the simultaneous preparation of diacetone alcohol and mesityl oxide comprising comingling liquid acetone with a hydrocarbon solvent solution containing from .1 to 2 moles of polyisopropoxy titanium stearate per mole of diacetone alcohol being obtained, continuously removing from the reaction mixture unreacted immiscible liquid acetone solution reaction products, and separating and recovering the desired reaction products by fractional distillation.

8. A process for the preparation of dibenzalacetone comprising mixing from .1 to 2 moles of titanium tetraisopropylate per mole of dibenzalacetone being produced with a mixture of acetone and benzaldehyde, subjecting the reaction mixture to refluxing, separating, and recovering the dibenzaldehyde product formed.

9. A process for the preparation of cyclohexylidene cyclohexanone comprising mixing about 12 mols of cyclohexanone with one mol of titanium tetraisopropylate, subjecting the mixture to refluxing, thereafter allowing the mixture to stand quiescent, and separating and recovering the product formed by hydrolysis and distillation.

10. A process for the preparation of dicyclohexylidene cyclohexanone comprising mixing about .5 mols cyclohexanone with one mol of titanium tetraisopropylate, refluxing the resulting reaction mixture, thereafter allowing the mixture to stand quiescent, and separating and recovering the product formed by hydrolysis and distillation.

11. A process for the preparation of cyclohexylidene cyclohexanone compounds comprising mixing from .5 to 12 mols of cyclohexanone with one mol of tetraisopropyl titanate, subjecting the mixture to refluxing, thereafter allowing the mixture to stand quescent, and then separating the product formed by hydrolysis and distillation.

References Cited in the file of this patent

UNITED STATES PATENTS

| | | |
|---|---|---|
| 2,269,935 | Ranford et al. | Jan. 13, 1942 |
| 2,272,378 | Lorand | Feb. 10, 1942 |
| 2,286,037 | Loder | June 9, 1942 |

OTHER REFERENCES

Jour. Amer. Chem. Soc., vol. 47, pp. 798–807 (1925); article by Child et al.